July 8, 1952
W. D. HERSHBERGER
2,602,835
MICROWAVE SPECTROSCOPY
Filed March 30, 1949
2 SHEETS—SHEET 2
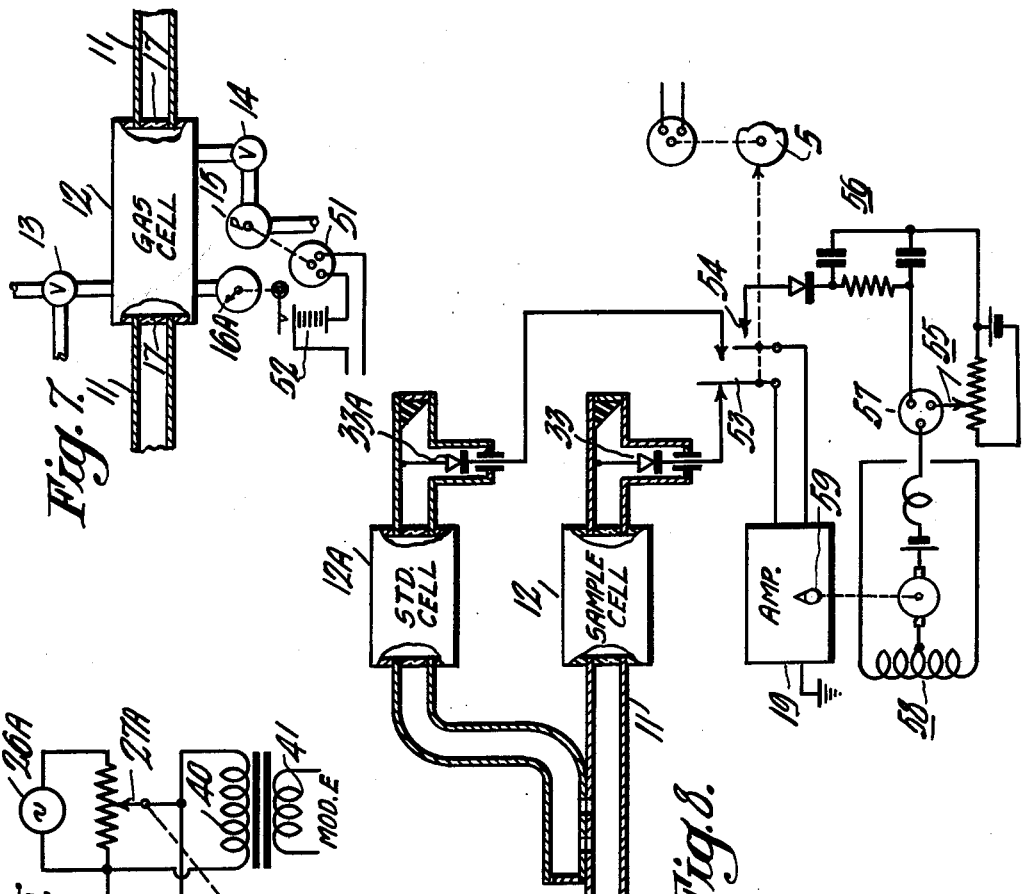
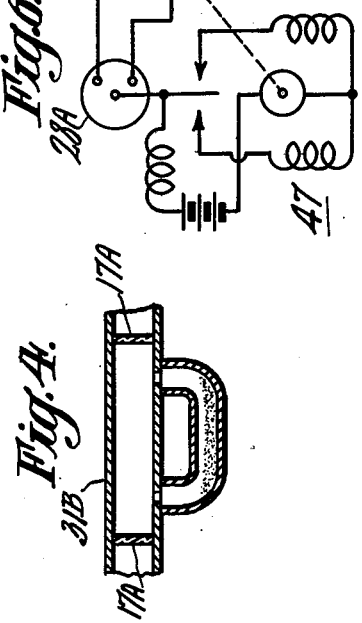
INVENTOR
*William D. Hershberger*
BY
*J. L. Whittaker*
ATTORNEY Patented July 8, 1952

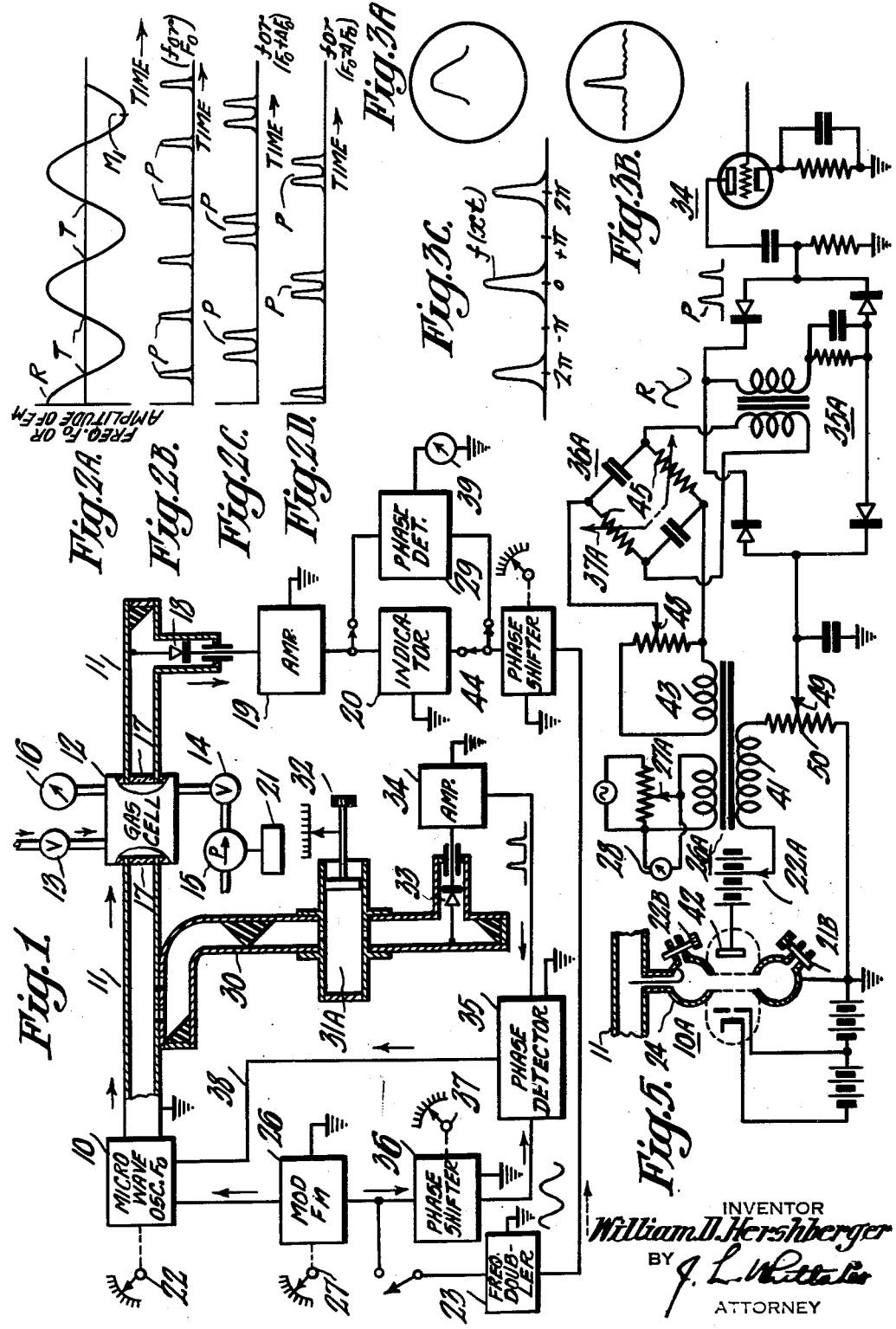

2,602,835

UNITED STATES PATENT OFFICE 2,602,835

MICROWAVE SPECTROSCOPY

William D. Hershberger, Princeton, N. J., assignor to Radio Corporation of America, a corporation of Delaware Application March 30, 1949, Serial No. 84,404

4 Claims. (Cl. 175—183)

This invention relates to microwave spectroscopy and particularly to spectrometer methods and systems in which a gas or vapor, generally termed "gas," is subjected to microwave energy for detection or measurement of the concentration of one or more components in a mixture of gases.

In many chemical or quasi-chemical processes, it may be desirable from the standpoint of safety or for optimum yield, to detect the presence or measure of the concentration of one or more gaseous components involved or evolved during various steps. A substantial number of organic or inorganic gases including ammonia, ethyl chloride, ethylene oxide, carbonyl sulphide, methyl halides and other gases having a dipole moment exhibit the property of absorption at microwave frequencies. At atmospheric pressure, the molecular resonance curve is broad but at low pressures, in the case of ammonia for example the molecular resonance curve or absorption/frequency characteristic breaks up into a unique pattern of sharply defined lines, each precisely corresponding with a definite frequency, typical of that gas. Thus, by scanning a gaseous mixture with a proper band of frequencies it is possible to detect, and under circumstances later discussed, to measure the concentration of a component gas or gases exhibiting resonance within that range. However, as there may be interlacing or overlapping of the absorption-line patterns of gases actually or potentially simultaneously present in the mixture, the qualitative or quantitative analysis may be seriously in error if there is a drift, in the frequency spectrum, of the band of scanning frequencies.

In accordance with the present invention, the mean carrier frequency of the spectrometer oscillator is stabilized by a control system including a sharply resonant circuit element which may be a resonant cavity tunable over a range of frequencies including absorption frequencies of the gas or gases to be detected or measured or which alternatively may be one of a set of standard gas cells exhibiting sharp molecular resonance at known frequencies corresponding with absorption lines of the gas or gases to be detected or measured.

Further in accordance with the invention, for quantitative analysis of a particular component of the gas sample, the bandwidth of the scanning oscillator and the pressure of the gas sample are also held constant during integration of the absorption measurement over the frequency interval of the scanning band so to insure proportionality of the measurement to the concentration of that component.

The invention further resides in spectrometer systems and methods having the novel features hereinafter described and claimed.

For a more detailed understanding of the invention and for illustration of a system incorporating and utilizing it, reference is made to the accompanying drawings in which:

Figure 1 is a block diagram of a stabilized microwave spectrometer;

Figures 2A–2D are explanatory figures referred to in discussion of the operation of Figure 1;

Figures 3A, 3B and 3C are absorption curves;

Figure 4 is a sectional view of a standard gas cell usable in the system of Figure 1;

Figure 5 schematically illustrates elements of a particular frequency-stabilizing system usable in Figure 1;

Figure 6 illustrates one form of automatic bandwidth control usable in the system of Figure 1;

Figure 7 schematically illustrates one form of gas-pressure control suitable for use in the system of Figure 1; and Figure 8 schematically illustrates one form of gain control suitable for use in the system of Figure 1.

Referring to Figure 1 as exemplary of a spectrometer system embodying and utilizing the invention, the high-frequency generator 10, which may be a klystron, a magnetron or other microwave oscillator, is coupled by a transmission line 11, such as a waveguide or a coaxial line, to a cell 12 which contains a sample of the gas to be analyzed. In most cases, the gas sample continuously flows through the gas cell and the rate of flow through the cell, which may be a resonant cavity or a length of waveguide, may be controlled by changing the settings of valves 13, 14 or by varying the speed of pump 15. The pressure of the gas within cell 12 for purposes later discussed may be indicated or recorded by a suitable instrument generically represented by gauge 16. The windows 17, 17 which serve as gas seals for cell 12 are of mica or other material transparent to the microwave energy transmitted to and from the cell.

As more fully discussed in various of my copending applications including Serial No. 596,242, filed May 28, 1945; Serial No. 786,736, filed November 18, 1947; Serial No. 4,497, filed January 27, 1948, and Serial No. 25,542, filed May 7, 1948, gases having a dipole moment, including those therein and herein mentioned, exhibit selective absorption at microwave frequencies. To detect the presence of an absorptive gas in the sample within cell 12, the frequency of oscillator 10 is varied to sweep over a range including a molecular resonant frequency of the gas suspected to be present. To that end, the oscillator frequency is varied, preferably sinusoidally, by a modulator or sweep-frequency generator 26 whose modulating range is adjustable by a bandwidth control member 27.

One suitable form of modulator is hereinafter specifically described by way of example. The median frequency of the oscillator 10 may be adjusted by a tuning device 22 which in the case of a reflex klystron, for example, may be an arrangement for mechanically adjusting the physical size of the klystron cavity. In any event, by adjustment of the control members 22 and 27, an operator may select the location and width of the range of frequencies swept by the modulator oscillator to search for the absorption lines of known gases.

In the particular arrangement of Figure 1, an indication of the presence of molecular resonance within the resonant absorption range of frequencies of a microwave absorptive gas is afforded by rectifying the microwave energy transmitted through cell 12, impressing the output of the rectifier 18, preferably after amplification by amplifier 19, upon a suitable indicating or recording instrument 20. For many processes, the instrument 20 may simply be a meter or signal device actuated by the output of amplifier 19; for other purposes, the instrument 20 may be a recorder whose stylus is positioned in accordance with the output of the rectifier 19; whereas, for other processes, the instrument 20 may be an oscilloscope having two beam-deflection systems respectively supplied from amplifier 19 and from modulator 26 or a frequency-doubler 23 associated therewith. Use of the oscilloscope is presupposed for purpose of further explanation of qualitative analysis by the spectroscope.

Assuming an absorption line is within the range of frequencies swept by oscillator 10, the trace or pattern appearing on the face of the oscilloscope will be generally similar to that shown in Figures 3A and 3B. In general, when the gas is at atmospheric pressure, the absorption line trace will be broad, Figure 3A, whereas when the gas is at low pressure, for example, when the range is from 0.05 to 1.0 millimeter of mercury, the absorption will be highly resolved—Figure 3B. Of course, in both cases, the rectified output of cell 12 is a recurrent waveform, Figure 3C, which repeats itself for each sweep of the absorption line.

As thus far described, the spectrometric methods and systems are generally similar to ones described and claimed in my aforesaid application Serial No. 596,242.

In monitoring of industrial processes, the microwave spectroscope may be in operation continuously for extended periods of time with the result the median frequency of oscillator 10 is subject to substantial departures from the selected median frequency. Such departures may arise from any one or more of several causes including changes in temperature of the resonant cavity dimensions of the oscillator tube, variations in supply voltages of the oscillator tube and variations in the load imposed upon the oscillator.

In accordance with the present invention, the median frequency of the spectroscope oscillator 10 is automatically stabilized continuously to correspond with a standard frequency which, for flexibility, may be the resonant frequency of a tunable cavity 31A (Figure 1) or which, for highest precision, may be the molecular resonant frequency of gas confined in a second gas cell 31B (Figure 4), preferably of the calibrated high-Q type described and claimed in my aforesaid copending application Serial No. 25,542. In either case, a portion of the microwave output of the modulated oscillator 10 is fed, as by the directional coupler 30, to the standard. The output of the frequency-standard device 31A or 31B is rectified by detector 33, which may be a diode or crystal rectifier, and, preferably after amplification of amplifier 34, is impressed upon one input circuit of a phase-detector 35 upon whose other input circuit is impressed the modulating frequency of modulator 26. For reasons later apparent, a phase-shifter 36 is interposed between the modulator 26 and the phase detector 35.

In operation of the spectroscope, the tunable standard 31A is set to the desired median frequency of oscillator 10 by adjustment of its tuning knob 32, or alternatively, there is substituted for it a selected gas-cell standard 31B exhibiting sharp molecular resonance at the desired median frequency. The oscillator 10 is tuned by knob 22 for operation at a frequency at least closely approximating the desired set-point frequency. The phase-shifter 36 is adjusted, if necessary, so that the output pulses P, Figure 2, occur at zeroes T of the modulating wave R; i. e. each pulse P corresponds in time with occurrence of the desired mean oscillator frequency. Assuming the median frequency drifts or shifts to a frequency higher than the center frequency or set-point frequency selected for analysis, the frequency-error pulses P supplied by rectifier 33 occur (Figure 2C) during the negative half-cycles of the timing wave R (Figure 2A) whereas when the center frequency of the scanned band drifts or shifts to a frequency lower than the frequency of standard 31A or 31B, the error pulses P occur (Figure 2D) during the positive half-cycles of the timing wave. The unidirectional output voltage of the phase-detector 35 therefore contains information concerning the sense and the extent of any deviation or departure from the selected center frequency and may be applied by control line 38 to the oscillator 10 to effect, in any of the various ways known to the art, a compensatory change of the operating frequency. The particular control arrangement included in Figure 5 and later herein discussed is one of several frequency-stabilizing arrangements disclosed in my aforesaid applications.

The directional coupler 30, rectifier 33, and phase-detector 35 are comprised in a negative feedback loop which automatically stabilizes the center frequency of the spectroscope oscillator 10 at the selected resonant frequency of standard 31A or 31B. Thus, an operator may set the spectroscope to scan a selected range of frequencies including the absorption line of a particular gas significant to the process being monitored and is assured that with little or no attention on his part the spectroscope will continue to scan that range and so afford a reliable qualitative analysis. For many processes, it is sufficient if the sensitivity of the spectroscope permits detection of one part in 500 of the absorptive gas but there is no difficulty in increasing the sensitivity so that much smaller concentrations can reliably be detected.

A precise quantitative analysis can be made if, in addition to stabilizing the center frequency of the oscillator, there are held constant the width of the scanning band and the pressure of the gas sample. With these conditions satisfied, the integrated area under the absorption curve (Figures 3A, 3B, 3C) is a linear function of the concentration or density of the particular gas producing the absorption and is independent of the presence of other gases. To preserve this linear relation, saturation of the absorptive gas by use of a microwave input which is too high or a gas pressure which is too low should be avoided. With the gas saturated, there are insufficient molecular collisions per second to preserve thermal equilibrium and as a result the absorption has a lag or time dependence. Saturation however is easily avoided and it suffices to mention its adverse effect.

To give a specific example of use of the spectroscope for quantitative analysis, it is assumed that the center frequency of oscillator 10 is stabilized at 23870.1 megacycles, that the bandwidth is held constant or stabilized at 3 megacycles and that the pressure in cell 12 is held constant at 0.05 millimeter of mercury. In such case the center frequency corresponds with the 3, 3 line of ammonia, the pressure affords good resolution and the bandwidth is adequate for complete scanning of the line. That the concentration of the ammonia is a linear function of the integrated area under the molecular resonance curve of this isolated line, may be checked by substitution of numerical values in Equation 1 below, which is a special case of Equation 13 on page 817 of the Journal of Applied Physics, volume 17, No. 10, October 1946, as part of a paper by Walter and appliicant.

$$\int_{v_1}^{v_2}\frac{\alpha_v dv}{v^2}=\frac{4\pi^3 N}{3ckT}\cdot\frac{\mu_0^2}{Q}\sum_{J,K}g(J,K)\frac{K^2}{J(J+1)}e^{-W\left(\frac{J,K}{kT}\right)} \quad (1)$$

where $N$=number of molecules per cm.$^3$ (i. e. density or concentration), $F_0=v$=stabilized median frequency; absorption line frequency, $v_1, v_2$=limits of the scanned frequency band.

All other terms, identified in said paper, are constant under the stabilized conditions here assumed and may be lumped as a constant K. Hence, $$\int_{23,869.5}^{23,871.5}\frac{\alpha_v dv}{(23,870.1)^2}=KN$$

Sets of calibration curves at a range of pressures may be made up so that for quantitative analysis of an unknown sample, an operator need read only the gas pressure from gauge 16 and the spectroscope output from indicator 20 and then read the concentration from the proper curve.

The gain of amplifier 19 may be preset to a suitable value by use of a microwave signal generator with known percentage of modulation; alternatively, the gain of amplifier 19 may be preset to a desired value and initial calibration of the spectroscope effected either by admitting a known sample gas to cell 12 or by temporarily replacing cell 12 by a second calibrating cell in which is sealed a gas of known composition, for example, 3% NH$_3$, 97% N$_2$. As later discussed in connection with Figure 8, such second or calibrating cell may be used to maintain the amplifier gain constant when continuous quantitative analysis is desired.

The aforesaid integration may be effected electrically for direct indication and continuous determination of the concentration by a "phase-detector" 29 whose unidirectional output is indicated by a meter 39. Upon one input circuit of the phase-detector 29 is impressed the modulating-voltage derived from the voltage used to vary the frequency of oscillator 10; actually since in the arrangement shown, the band is swept twice for each cycle of the modulating-voltage, the sweep-frequency is doubled by doubler 23 for impression upon this input circuit of the phase-detector. When the phase of this reference voltage is properly adjusted by phase-shifter 44, there is maximum output of the phase-detector 29 and the magnitude of this output depends upon the area under the absorption curve. As the magnitude of the output-voltage of detector 29 also depends upon the amplitude of the phase-reference voltage $E_0$ from doubler 23, voltage $E_0$ must be held constant. The base-line of the cell output curve (Figure 3A, 3B or 3C) must also be held constant for integration purposes; this may be accomplished by a D. C. restorer circuit such as described in RCA Review, volume IX, pages 85–111.

Designating the sweep-frequency as $$\tfrac{1}{2}\cdot\frac{\omega_0}{2\pi}$$

the output of amplifier 19 has a fundamental component of frequency $$\frac{\omega_0}{2\pi}$$

and the amplitude of this fundamental is measured by the phase-detector 29.

The output of the phase-detector is proportional to N, (density of the absorptive gas) and is actually proportional to the integral $$\int_{-\pi}^{+\pi}[E_0\cos\omega_0 t][f(xt)]dt$$

where $f(xt)$, Figure 3C, represents the absorption curve as a continuous function of time and $x$ is a parameter dependent upon the sweep speed and bandwidth (see Equation 6 of aforesaid paper). The foregoing integral will be recognized as one involved in finding one coefficient in a Fourier series, and is convergent because over the range $-\pi$ to $+\pi$, the integrals of the Equations 12 and 13 of said paper are convergent. With the system parameters held constant, the reading of meter 39 is a direct indication of the concentration of the absorptive gas. Foreign gases do not affect the accuracy of the measurement unless, of course, one of them has an absorption line in the selected scanning range of the modulated oscillator 10, in which case the median frequency $F_0$ of the oscillator is shifted for scanning of another ammonia line, for example, the 2, 2 or the 4, 3 line.

The bandwidth of the output circuit of detector 29 may be very low, for example, one cycle per second with advantageous increase in the signal-noise ratio and concomitant ability to detect small signals corresponding with low concentrations of a microwave-absorptive gas.

It is again to be noted that integration of $$\int_{v_1}^{v_2}\frac{\alpha_v dv}{v^2}$$

yields a constant of which one factor is N (the density). The fact that the shape of the curve itself may vary in a complicated manner is of no consequence provided the scanning band is wide enough to obtain the integral desired and narrow enough to exclude any adjacent absorption lines of the foreign gas. This relation is true of any selected spectral line of a microwave absorptive gas and also is true of Zeeman components of such line.

Although in its components and connections, the device 29 is a "phase-detector," the phase relation of its input voltages is held constant for integration of the area of the absorption waveform and hence the term "lock-in" detector is equally applicable. It may equally well be considered a "heterodyne" detector adjusted for zero beat of two input signals, in which event the output is direct-current.

The "phase-detector" method above described is but one method of determining the percentage modulation of a microwave carrier cyclically swept through an absorption line. Provided the mean carrier frequency, the swept bandwidth and the gas pressure are maintained constant, any other method of measuring the modulation index or percentage may be used for quantitative analysis by the microwave spectroscope. For example, the audio output voltage resulting from sweeping through an absorption line by the output of the frequency-modulated generator 10 is measured and then using a fixed carrier with cell 12 free of absorptive gas, the oscillator is amplitude-modulated by an input voltage which is varied until the same audio output is obtained. The ratio of the two voltages is a measure of the concentration of the molecular resonant gas. A principal advantage of the phase-detection method is its sensitivity because very small modulation percentages are accurately measurable.

As shown in Figure 5, the microwave generator of the spectroscope may be a reflex klystron 10A, the dimensions of whose cavity 24 may be varied by adjustment of the tuning screws 22b to change the frequency of the generated oscillations. The operating frequency may also be varied by adjustment of the supply voltage for anode 42. The variable source of anode voltage is exemplified by a battery having a voltage-adjusting tap 22A.

The modulator may comprise a transformer 26A having its secondary winding 41 in the anode circuit of the klystron and its primary winding in circuit with any suitable A. C. power source such as a 110 volt-60 cycle line. The magnitude of the modulating voltage applied to the oscillator and therefore the width of the band of frequencies scanned by the frequency-modulated oscillator may be varied by adjustment of contact 27A of a potentiometer. The bandwidth or modulating voltage may be read from voltmeter 28. Contact 27A may be adjusted manually from time to time to correct for line voltage changes. For continuous quantitative analysis, the swept bandwidth may automatically be maintained constant; for example, as shown in Figure 6, a contact-voltmeter 28A may be used to control a reversible motor 47 which adjusts the bandwidth control 27A in compensation for line voltage changes.

The phase-shifter 35 of Figure 1 may, as shown in Figure 5, comprise a rectifier bridge 35A which receives the frequency-error pulses P from amplifier 34 and a timing wave R from the modulator 26A.

The phase-shifter 36 of Figure 1 may, as shown in Figure 5, comprise a resistor-capacitor network 36A capable of shifting the phase relation of its input and output voltages throughout a range of about 180° without varying the magnitude of the output voltage. The resistors 45, 45 adjustable in unison by the phase-control member 37A are of resistance equal to the reactance of the capacitors at the modulator frequency. The phase-shifter 44 of Figure 1 may be of this same type.

The magnitude of the modulating voltage as impressed upon the phase-detector 35A may be adjusted by varying the contact 48 of a potentiometer in shunt to secondary winding 43 of the modulator transformer 26A.

A desired percentage of the unidirectional output voltage of the phase-detector 35A may be introduced into the anode circuit of the klystron for stabilization of its mean carrier frequency by adjustment of contact 49 of resistor 50 common to the output circuit of the phase-shifter and the anode circuit of the klystron. For a more complete description of the phase-detector and its operation in stabilization of a microwave generator reference may be had to my copending application Serial No. 4,497, filed January 27, 1948.

As exemplary of an arrangement for maintaining the gas pressure constant during extended periods of quantitative analysis, there is shown in Figure 7 a system for regulating the speed of motor 51 which drives the vacuum pump 15. The movable element of pressure gauge 16 is coupled to a carbon-pile regulator 52 which controls the motor speed to maintain a desired pressure within the gas-sample cell 12. Any other sensitive pressure-control system, many of which are known, may of course be used.

As exemplary of an arrangement for maintaining the gain of amplifier 19 constant for extended periods of gas analysis, there may be used the control system shown in Figure 8. Under control of timing cam 5 and contact 53 actuated thereby, the input circuit of amplifier 19 is disconnected from rectifier 33 of the sample cell 12 and connected to rectifier 33A of the standard 12A which, as previously described, may be a sealed cell containing a known concentration of the absorptive gas in cell 12. Concurrently with connection of the standard cell to the input circuit of the amplifier, the switch 54 in its output circuit is closed for comparison of its output voltage with a standard voltage which may be supplied by potentiometer network 55. For such comparison, the output of amplifier is converted to direct-current by the filter-rectifier network 56. The contact galvanometer 57 or equivalent device responsive to unbalance of the voltage may be used to control the reversible motor 58 which is coupled to the gain-control element 59 of the amplifier. At suitable intervals, the amplifier gain is thus checked and if the signal gain does not correspond with the setting of potentiometer 55, the motor 58 is energized to effect a compensating adjustment of the gain control 19.

For many purposes, the servo-systems of Figure 6 and Figure 8 may be omitted and constancy of the modulating voltage and of the amplifier gain insured by use of well-regulated supply sources using induction regulators, electronic regulators and the like, all well known in the voltage-control art.

From the foregoing specific examples of Figures 5 to 8 and from the foregoing explanation of the requirements to be met for quantitative analysis by the microwave spectroscope of Figure 1, many other generically similar arrangements will be evident and need not be discussed in detail.

I claim as my invention:

1. A microwave spectrometer for quantitative gas analysis comprising a microwave generator, a cell containing gas to be analyzed and upon which the generated microwave energy is impressed, a modulator coupled to said oscillator for repeatedly varying the oscillator frequency over a band of frequencies, exhibiting means including an amplifier coupled to said cell for integrating microwave energy transmitted by said gas, and means for maintaining proportionality of the integrated energy to the concentration in said cell of gas having a dipole moment comprising means for maintaining constant the gain of said amplifier, means for maintaining the gas pressure of the cell constant at low magnitude affording resolution of discrete absorption lines of said gas, and means for maintaining constant the mean frequency and bandwidth of the oscillator output for repeated scanning of a selected absorption line.

2. A microwave spectrometer for quantitative gas analysis comprising a frequency-modulated microwave generator, a cell containing gas to be analyzed and upon which the generated microwave energy is impressed, means for establishing the gas pressure of said cell at low magnitude affording resolution of discrete absorption lines of said gas, means coupled to said oscillator for stabilizing the mean carrier frequency and bandwidth of the oscillator output repeatedly to scan a selected absorption line, and exhibiting means including a constant gain amplifier coupled to said cell for integrating microwave energy transmitted by said gas.

3. A method of analyzing a gas for quantitative determination of a component having a dipole moment which comprises subjecting the gas to pressure sufficiently low to resolve discrete absorption lines characteristic of said component, repeatedly sweeping the gas with a band of microwave frequencies of width sufficient completely to sweep a selected one of said absorption lines, rectifying and amplifying the microwave energy transmitted by said gas to produce a recurrent wave, integrating the recurrent wave, simultaneously maintaining constant the pressure of said gas, the width of said band and the amplification of the transmitted energy to maintain proportionality of the concentration of said component to the integrated value of said wave, and utilizing said integrated wave for said analyzing.

4. A method of analyzing a gas for quantitative determination of one of two or more components having dipole moments which comprises subjecting the gas to pressure sufficiently low to resolve discrete absorption lines characteristic of said components, repeatedly sweeping the gas with a band of microwave frequencies whose mean frequency and bandwidth are chosen to sweep a selected absorption line of said one of said components, rectifying and amplifying the microwave energy transmitted by said gas to produce a recurrent wave, integrating the recurrent wave, simultaneously maintaining constant the pressure of said gas, the width of said band and the amplification of the transmitted energy to maintain proportionality of the integrated value of said wave to the concentration of said one of said components and utilizing said integrated wave for said analyzing.

WILLIAM D. HERSHBERGER.

REFERENCES CITED

The following references are of record in the file of this patent:

UNITED STATES PATENTS

| Number | Name | Date |
|---|---|---|
| 2,457,673 | Hershberger | Dec. 28, 1948 |
| 2,457,695 | Liskow | Dec. 28, 1948 |
| 2,475,074 | Bradley | July 5, 1949 |

OTHER REFERENCES

Physical Review, vol. 70, August 1 and 15, 1946, article by Good, pages 213–218.